C. S. SMITH.
Improvement in Wrought-Iron Columns.

No. 133,263. Patented Nov. 19, 1872.

Witnesses.
C. B. Nottingham
Thomas C. Smith

Inventor.
C. Shaler Smith
by atty A. Pollok

C. S. SMITH.
Improvement in Wrought-Iron Columns.
No. 133,263. Patented Nov. 19, 1872.

Witnesses.
C. B. Nottingham
Thomas C. Smith

Inventor.
C. Shaler Smith
by atty A. Pollok

3 Sheets--Sheet 3.
C. S. SMITH.
Improvement in Wrought-Iron Columns.
No. 133,263. Patented Nov. 19, 1872.
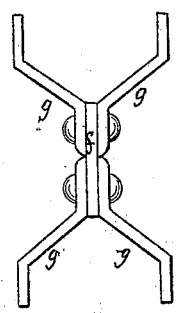
Fig. 10.
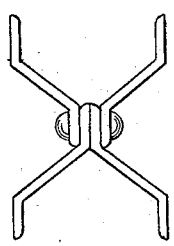
Fig. 11.
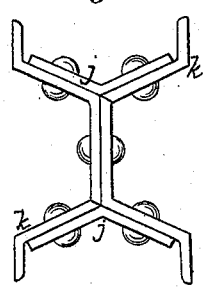
Fig. 12.
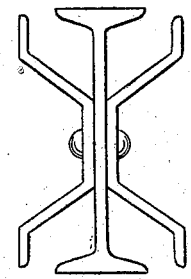
Fig. 13.
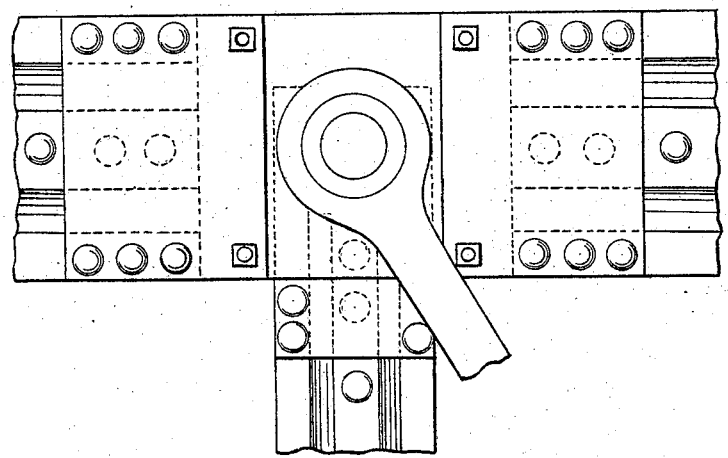
Fig. 14.
Fig. 15.
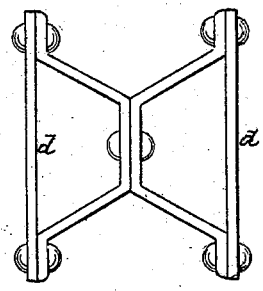
Fig. 16.
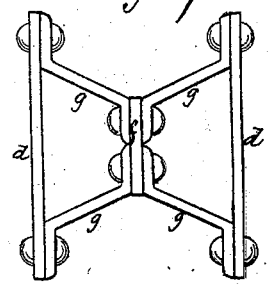
Fig. 17.
Witnesses
C. B. Nottingham
Thomas C. Smith
Inventor.
C. Shaler Smith
by atty A. Pollok
AM. PHOTO-LITHOGRAPHIC CO. N.Y. (OSBORNE'S PROCESS.)

UNITED STATES PATENT OFFICE.

C. SHALER SMITH, OF BALTIMORE, MARYLAND.

IMPROVEMENT IN WROUGHT-IRON COLUMNS.

Specification forming part of Letters Patent No. 133,263, dated November 19, 1872.

*To all whom it may concern:*

Be it known that I, C. SHALER SMITH, of the city and county of Baltimore and State of Maryland, have invented certain new and useful Improvements in Wrought-Iron Columns for Bridges and other purposes, of which the following is a specification:

My invention relates to columns designed principally for use in bridges as chords, struts, or posts, but which may also be employed in other structures.

My object is to obtain a column which, while possessing the requisite strength, will at the same time have the following among other advantages: First, all the parts accessible to inspection and painting; second, connections both of cast and wrought iron may be easily made; third, the employment of the minimum number of rivets to the pound of iron-work.

The feature common to the columns hereinafter described is that in all, the segments, whatever may be their shapes, are turned back to back and riveted together.

I shall not now enumerate the various figures in the drawing, but will mention them as required in the course of this specification.

The column shown in section in Figure 1 is composed of two segments of the shape shown, each having a web, $a$, and two diverging flanges, $b$, with preferably a stiffening-rib, $c$, at the end of each flange. The two segments are placed with the webs back to back, and are riveted together with a single row of rivets. The mode of making the post foot and head connections for a column of this kind is shown in Figs. 1ª and 1ᵇ. Wrought-iron plates $d$ are riveted to the ribs $c$ at the head or foot of the post, and through these plates and the webs of the segments the pin $e$ for the tension-bars, &c., passes.

In Fig. 2 the segments are semi-cylindrical, and are riveted together back to back, as in Fig. 1. The wrought-iron foot and head connections shown in Figs. 2ª and 2ᵇ are the same as already described in Figs. 1ª and 1ᵇ.

Fig. 18 represents a section of a column composed of two segments with webs placed back to back and riveted together as in Fig. 1, but with flanges curved outwardly about a quarter of a circle, more or less.

In Figs. 14, 15, 16, 17, I have represented the mode of making the top-chord connection with a top chord of substantially the section shown in Fig. 1, the chord being composed either of segments of the kind in Fig. 1, or of shapes such as are seen in Fig. 17, in which each segment on one side of the central plate $f$ is built up of two zigzag pieces, $g$, put together so as to resemble in shape one of the segments of the column in Figs. 1 or 16, the riveting together of the parts of the column being effected as represented.

Fig. 14 is a side view, and Fig. 15 a bottom view, of the connection. The contiguous ends of the chord-sections are united by means of a casting, $h$, whose ends are received between the connecting-plates $d$ of the cords, and fastened to the same by bolts $i$, as shown. The casting also receives the head of the post and the pin, as indicated. It will thus be seen that the connections can be most readily and expeditiously made.

Fig. 10 represents a column formed of wrought-metal segments substantially like those in Fig. 17.

Fig. 11 is a column composed of zigzag segments put together as shown, and united through the four thicknesses of the feet or webs, as they may be called, by a single row of rivets.

Figure 1:
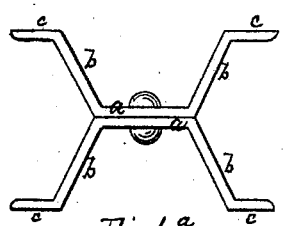
Figure 2:
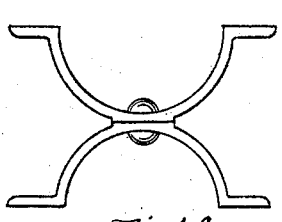

Fig. 12 represents still another mode of producing a column of substantially the section shown in Fig. 1 from segments of irregular shapes. In this column, however, angle-pieces $j$ are employed to hold the L-shaped segment $k$, which go to make up the column; and these same pieces also serve to give greater strength and stiffness and add to the section of the column. They are united to the column by rivets passing through the flanges, as shown.

Figure 9:
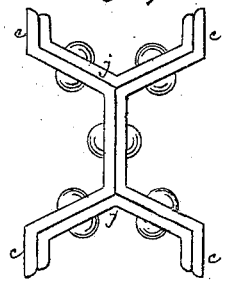
Figure 9:
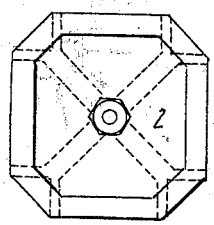

Fig. 9 represents the stiffening angle-pieces $j$, provided in this instance with flanges setting against the ribs $c$ applied to the column in Fig. 1.

In case it is desired to employ segments of the kind shown in Fig. 1 or analogous shapes for a deck or draw-bridge chord exposed to both compressive and transverse strains, I employ the arrangement shown in Fig. 13, where the segments are placed back to back on opposite sides of the web of an I-beam, and then riveted together through the web.

Figure 3:
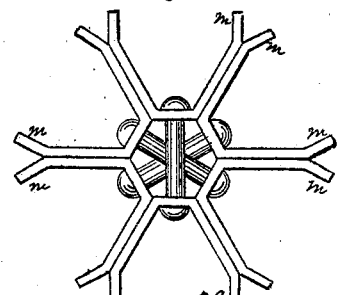
Figure 1A:
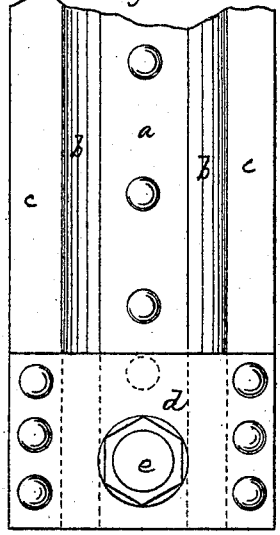
Figure 2A:
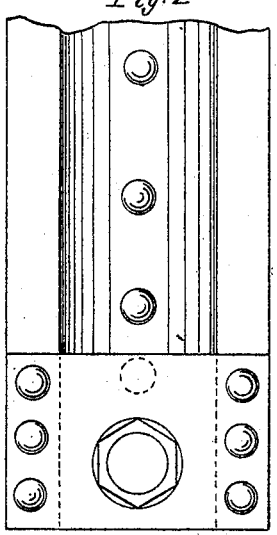
Figure 3A:
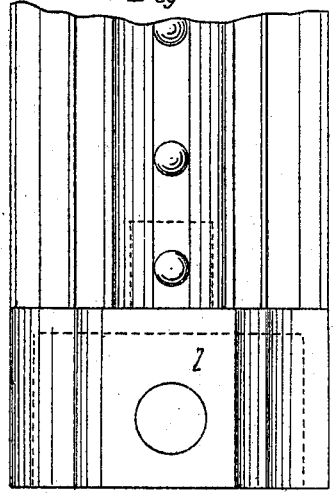
Figure 1B:
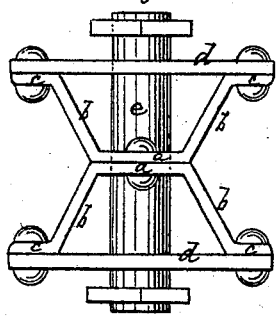
Figure 2B:
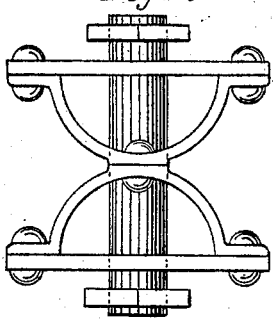
Figure 3B:
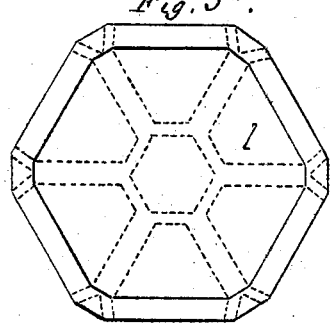
Figure 18:
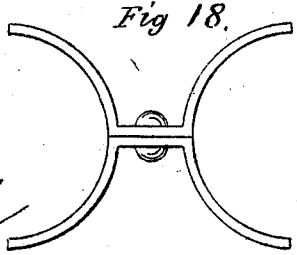
Figure 4:
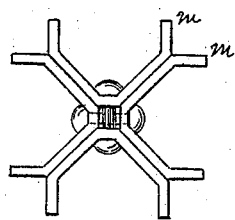

In Figs. 3 and 4 four or more segments make up the column. The webs are in this instance not in contact, but the adjoining flanges of the contiguous segments are being placed back to back, as shown. The riveting, however, takes place, as before, through the webs.

Figure 5:
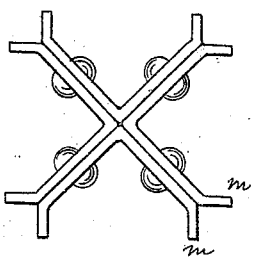
Figure 6:
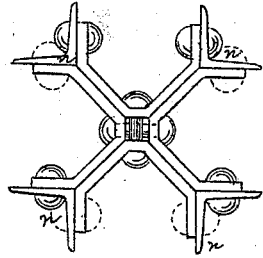
Figure 6:
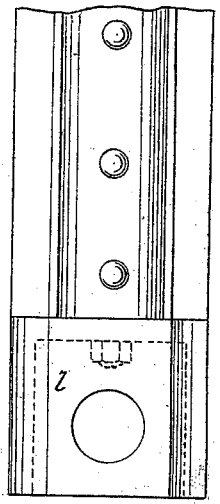
Figure 7:
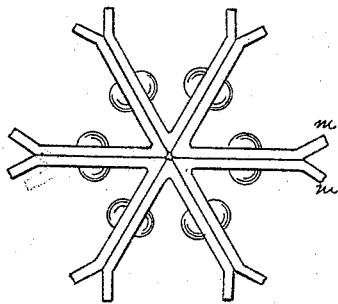
Figure 8:
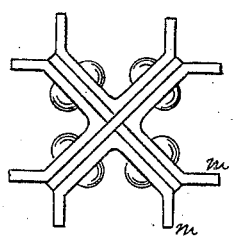

These columns may be left hollow, with a filling-bar at each end, which is turned up and screw-cut for connection with a cast-metal foot and head, $l$, as shown at Figs. 4ª, 4ᵇ, 3ª, 3ᵇ, or the filling-bar, of either wrought or cast metal, may run from end to end of the column, with the projection portions fitted for tenons or connecting-bolts for connection with the cast-iron post or head. Where the flanges are laid back to back, as just described, I prefer to bend the outer edges of the sections, as shown at $m\ m$, the diverging lines of the bent portion of the sections forming a V. This is for the purpose of strengthening the radial lines of the shapes in Figs. 3 and 4 by the bracing effect of the angles at the extremities. The same formation is of great advantage in columns built up of V or angle iron sections flange-riveted, as shown in Figs. 5, 7, and 8. The column-section may be increased by fitting and riveting angle-strips in the angles formed by bending the edges of the sections, as shown at $n$, Fig. 6.

I have thus described, by reference to the drawing, various ways of carrying into effect my invention.

While describing what I deem to be the most preferable ways, however, it will be understood that I do not limit myself to the precise details herein described, as the same may be varied without departure from the principle of my invention.

What I claim, and desire to secure by Letters Patent, is—

1. A wrought-iron column for bridges and other purposes composed of sections, of the form substantially as herein shown and set forth, placed back to back and riveted together, as described.

2. In wrought-iron columns of a section, substantially such as represented in Figs. 4 and 5 of the accompanying drawing, I claim the outer edges of the sections flanged or bended, substantially as shown and described.

In testimony whereof I have signed my name to this specification before two subscribing witnesses.

C. SHALER SMITH.

Witnesses:
SAML. H. YONGE,
A. B. THOMPSON.